United States Patent
Nieuwland (10) Patent No.: US 7,849,390 B2
(45) Date of Patent: Dec. 7, 2010

(54) DATA COMMUNICATION MODULE PROVIDING FAULT TOLERANCE AND INCREASED STABILITY

(75) Inventor: Andre Krijn Nieuwland, Eindhoven (NL)

(73) Assignee: Koninklijke Phillips Electronics N.V., Eindhoven (NL)

( * ) Notice: Subject to any disclaimer, the term of this patent is extended or adjusted under 35 U.S.C. 154(b) by 299 days.

(21) Appl. No.: 10/598,301

(22) PCT Filed: Feb. 23, 2005

(86) PCT No.: PCT/IB2005/050657

§ 371 (c)(1),
(2), (4) Date: Aug. 7, 2008

(87) PCT Pub. No.: WO2005/088467

PCT Pub. Date: Sep. 22, 2005

(65) Prior Publication Data

US 2008/0288844 A1 Nov. 20, 2008

(30) Foreign Application Priority Data

Mar. 3, 2004 (EP) .................................. 04100853

(51) Int. Cl.
*G06F 11/08* (2006.01)
*H03M 13/00* (2006.01)
(52) U.S. Cl. ..................................... 714/801
(58) Field of Classification Search .......... 714/800–804
See application file for complete search history.

(56) References Cited

U.S. PATENT DOCUMENTS 3,889,072 A * 6/1975 Stewart ....................... 379/344
4,667,337 A    5/1987 Fletcher
5,748,902 A    5/1998 Dalton et al.
6,046,943 A    4/2000 Walker
6,647,245 B1 * 11/2003 Rosenbaum .................. 455/45

FOREIGN PATENT DOCUMENTS

| EP | 1336972 A1 * | 8/2003 |
| JP | 62-140155 | 6/1987 |
| JP | 05-334206 | 12/1993 |
| JP | 06-267274 | 9/1994 |

OTHER PUBLICATIONS

Chen, Z."The LSP Protection Restoration Mechanism in GMPLS"; Oct. 1, 2002; ZP002239552.
"Balanced LVD SCSI Drivers and Receivers"; by The SCSI Trade Association From Computer Technology Review, Sep. 1997.
Mircea R. Stan et al, "Bus-Invert Coding for Low-Power I/O", IEEE Transactions on Very Large Scale Integration (VLSI) Systems, vol. 3, No. 1, Mar. 1995, pp. 49-58.

* cited by examiner

*Primary Examiner*—Guy J Lamarre (57) ABSTRACT

A module for transmitting sets of data bits to another module via a communication bus using dual-rail encoding is provided that has a reduced switching activity. The module comprises bus invert coding means adapted to compare a set of data bits with a preceding set of data bits to determine an indication of the number of transitions required to transmit the set of data bits; invert the set of data bits prior to transmission if it is determined that the number of transitions required to transmit the set of data bits is greater than half the total number of bits in the set of data bits; and provide an indication of whether the set of data bits has been inverted; the module also comprising means adapted to generate respective copies of the data bits in the set of data bits; and means adapted to transmit to the other module, via the communication bus, the set of data bits, their respective copies and the indication of whether the set of data bits has been inverted.

29 Claims, 10 Drawing Sheets

DATA COMMUNICATION MODULE PROVIDING FAULT TOLERANCE AND INCREASED STABILITY

The invention relates to a system including a signal or data bus, and in particular to reducing the switching activity in buses of high speed, high density integrated circuits that use fault tolerant codes.

As integrated circuit technology is scaled to provide increased density on a chip, the on-chip interconnects tend to become narrower and narrower. This leads to an increase in coupling capacitance with neighboring wires, which in turn leads to increased interference or crosstalk between wires.

One problem for integrated circuit technology, and particularly for deep submicron and high-speed designs, is 'ground bounce'. Drivers of an output buffer connected to an off-chip interconnect have to deliver large currents to charge the highly capacitive loads. When drivers switch simultaneously, the large current drawn causes a drop in the supply voltage. Likewise, when the buffers have to discharge the external lines, a large amount of charge is dumped on the ground plane. This may cause the voltage of the ground plane to rise. The reduced voltage difference between the supply and ground plane causes a reduced noise margin and a reduced speed. Hence an integrity problem arises.

It is known in the art that 'ground bounce' can be reduced by increasing the AC and DC stability of the circuit. AC stability is achieved when the number of transitions from a first state to a second state equals the number of transitions from the second state to the first state. DC stability is achieved when the number of first states equals the number of second states.

The document "Balanced LVD SCSI Drivers and Receivers" by The SCSI Trade Association from Computer Technology Review, September 1997 shows a Balanced LVD Driver that has a reduced ground bounce and a reduced simultaneous switching current.

If the environment in which a bus or communication channel transfers data to a circuit is prone to errors, it is desirable to provide means for correcting errors in the transmitted data. Alternatively, means can be provided for detecting errors, and then retransmission of the data can be requested. Such a bus or communication channel is said to be fault tolerant.

Figure 1:
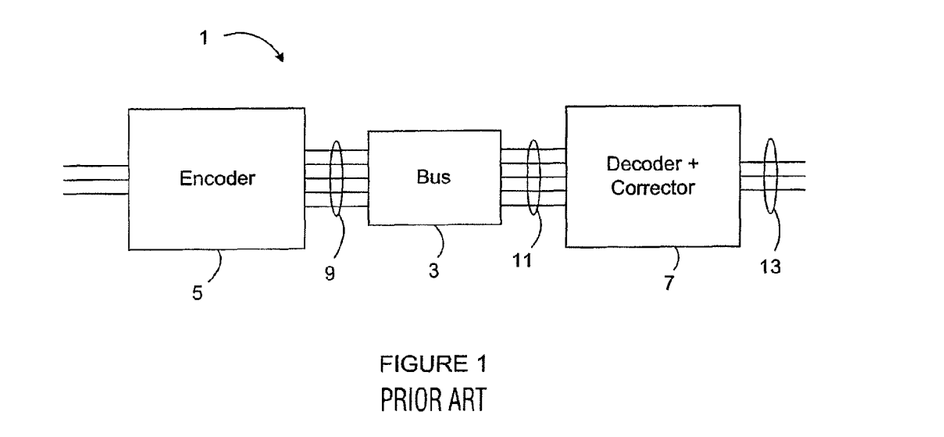
FIG. 1 is a schematic illustration of a typical fault tolerant bus structure.

FIG. 1 shows a schematic illustration of a typical fault tolerant bus structure 1. The bus structure 1 comprises a communication bus 3 for communicating data between an encoder 5 and decoder 7. The bus 3 receives output data 9 from the encoder 5, and provides input data 11 to the decoder 7.

One fault tolerant method is known as 'dual-rail encoding'. In dual-rail encoding, a data bit is copied, and the copy can be used when an error in the data bit is detected. To be able to correct an error in a data bit, it is necessary to identify whether the data bit contains an error, and a parity bit is provided to enable this. Incidentally, as the data bit and copy bit are the same, the crosstalk between the two wires carrying the data and copy bits will be eliminated.

Figure 2:
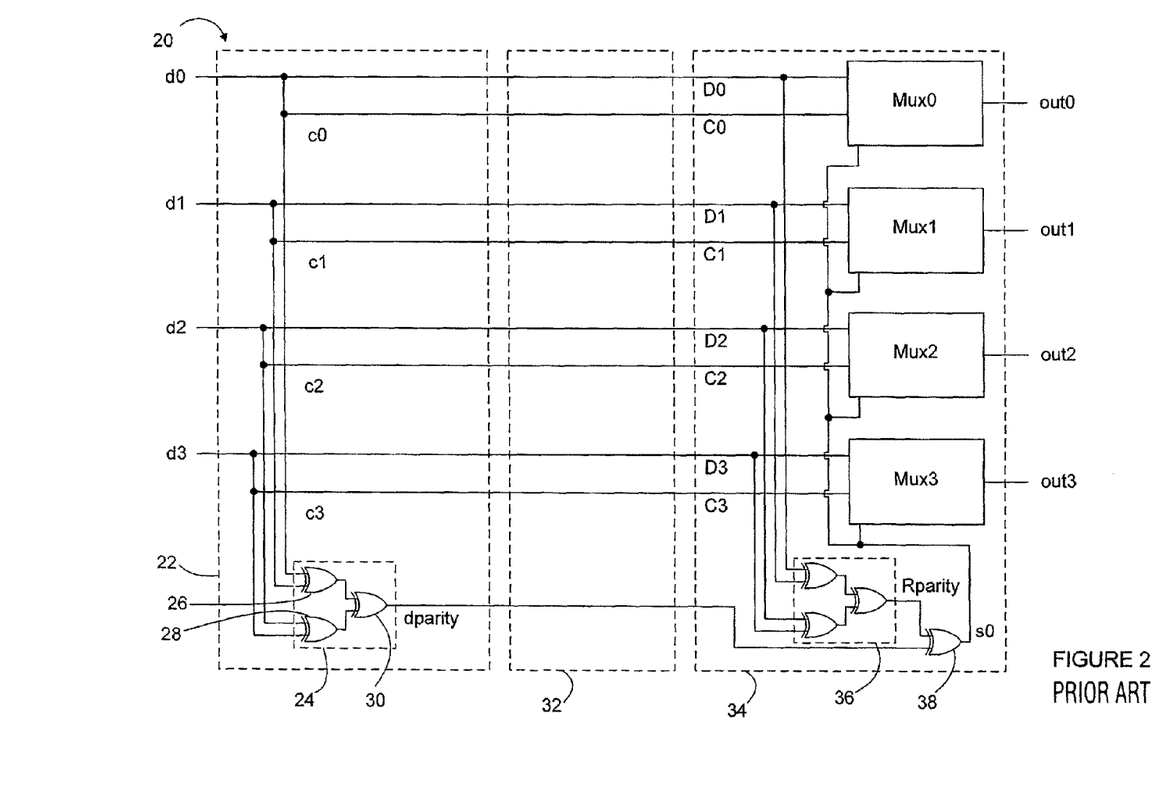
FIG. 2 shows a prior art dual-rail bus structure.

FIG. 2 shows a prior art dual-rail bus structure 20. The input data bits d0, d1, d2 and d3 are the signals provided to the encoder 22. Respective copies c0, c1, c2 and c3 of the data bits d0, d1, d2 and d3 are created. A parity bit, dparity, is calculated for the data bits to be transmitted using a parity tree 24 comprising, for example, exclusive OR gates 26, 28 and 30.

The data parity bit, dparity, data bits d0, d1, d2 and d3 and their copies c0, c1, c2 and c3 are transmitted over a communications bus 32 to a decoder 34.

During transmission, the transmitted data bits and their copies may become 'faulty', that is, the transmitted bit may be detected as a '1' instead of a '0', or vice versa. Therefore, the data bits D0, D1, D2 and D3 and the copies C0, C1, C2 and C3 received at the decoder 34 may, or may not, be the same as the data bits d0, d1, d2 and d3 and copy bits c0, c1, c2, c3 transmitted by the encoder 22. A data parity bit, Rparity, is calculated for the data bits D0, D1, D2 and D3 received from the communications bus 32 by a parity tree 36, which is identical in structure to the parity tree 24 in the encoder 22. A multiplexer control bit, s0, is determined by comparing the data parity bit, Rparity, with the data parity bit received over the communications bus 32. In this illustrated system, the comparison is performed by an exclusive OR gate 38.

The multiplexer control bit s0 is fed into a plurality of multiplexers Mux0, Mux1, Mux2 and Mux3 that act as correction circuits. Each multiplexer Mux0, Mux1, Mux2 and Mux3 receives a respective received data signal D0, D1, D2 or D3 and a corresponding received copy of the data signal C0, C1, C2 or C3. The multiplexer control bit s0 controls whether each multiplexer outputs the received data signal or the received copy of the data signal.

When the parity of the received data, Rparity, is the same as the received data parity bit, the multiplexer control bit, s0, is a '0', which instructs the multiplexers Mux0, Mux1, Mux2 and Mux3, to output the received data bits D0, D1, D2 and D3. When the data parity bit, Rparity, is different to the received data parity bit, the multiplexer control bit s0 is a '1', which instructs the multiplexers Mux0, Mux1, Mux2 and Mux3, to output the received copies of the transmitted data bits C0, C1, C2 and C3.

However, there are twice as many wires switching at any one time in a dual-rail encoding system compared with a single-rail system, and the problem of ground bounce is therefore increased.

There is therefore a need to reduce the switching activity in integrated circuits using dual-rail encoding to transmit data across a data bus, whilst reducing or eliminating ground bounce.

According to a first aspect of the present invention, there is provided a module for transmitting sets of data bits to another module via a communication bus, the module comprising bus invert coding means for reducing the number of transitions on the communication bus as the module operates; the bus invert coding means being adapted to compare a set of data bits with a preceding set of data bits to determine an indication of the number of transitions required to transmit the set of data bits; invert the set of data bits prior to transmission if it is determined that the number of transitions required to transmit the set of data bits is greater than half the total number of bits in the set of data bits; and provide an indication of whether the set of data bits has been inverted; means adapted to generate respective copies of the data bits in the set of data bits; and means adapted to transmit to the other module, via the communication bus, the set of data bits, their respective copies and the indication of whether the set of data bits has been inverted.

In one embodiment of the invention, the means adapted to generate respective copies of the data bits is further adapted to invert the respective copies.

Preferably, means adapted to generate a first parity bit from the set of data bits is provided, and the means adapted to transmit is further adapted to transmit the first parity bit to the other module.

Preferably, the means adapted to generate a first parity bit comprises one or more logic gates.

Preferably, means adapted to generate a copy of the first parity bit is provided, and the means adapted to transmit is further adapted to transmit the copy of the first parity bit to the other module.

In one embodiment, the means adapted to generate a copy of the first parity bit is further adapted to invert the copy of the first parity bit.

In a preferred embodiment, the indication of whether the set of data bits has been inverted is encoded in the first parity bit and its respective copy.

Preferably, the first parity bit and its respective copy are inverted before transmission if the set of data bits has been inverted by the bus invert coding means.

Alternatively, the first parity bit and its respective copy are inverted before transmission if the set of data bits has not been inverted by the bus invert coding means.

In an alternative embodiment, the indication comprises an invert signal.

Preferably, means are provided for generating a copy of the invert signal; and the means adapted to transmit is further adapted to transmit the copy of the invert signal to the other module.

Preferably, the means adapted to generate a copy of the invert signal is further adapted to invert the copy of the invert signal.

According to a second aspect of the present invention, there is provided a module for receiving sets of data bits from another module via a communication bus, the module comprising means adapted to receive a set of data bits, respective copies of the set of data bits and an indication of whether the set of data bits has been inverted; means adapted to select the received data bits as the output of the module in the event that the indication of whether the set of data bits has been inverted indicates that the set of data bits has not been inverted, and to select the inverse of the received data bits as the output of the module in the event that the indication indicates that the set of data bits has been inverted.

In one embodiment, the respective copies of the set of data bits are inverted copies of the set of data bits.

Preferably, the module comprises means for detecting the presence of one or more errors in the received set of data bits.

Preferably, the means adapted to receive is further adapted to receive a first parity bit from the other module and the module further comprises means adapted to generate a second parity bit from the received set of data bits. The means adapted to detect the presence of one or more errors in the received set of data bits is adapted to compare the first and second parity bits.

In one embodiment, the module further comprises means for correcting errors in the received set of data bits, the means for correcting errors being adapted to output a received data bit or its respective copy in response to a control signal output by the means adapted to detect.

Preferably, the means adapted to receive is further adapted to receive a copy of the first parity bit from the other module.

In a preferred embodiment, the indication of whether the set of data bits has been inverted is encoded in the received first parity bit and its copy.

Preferably, the module further comprises means adapted to generate a third parity bit from the respective copies of the set of data bits and means adapted to compare the received first parity bit, the received copy of the first parity bit, the second parity bit and the third parity bit to determine whether the set of data bits has been inverted.

In an alternative embodiment, the indication comprises an invert signal.

Preferably, the means adapted to receive is further adapted to receive a copy of the invert signal from the other module.

Preferably, the copy of the invert signal is an inverted copy of the invert signal.

Preferably, the module further comprises means for detecting the presence of an error in the received invert signal or its respective copy.

Preferably, the means for detecting the presence of an error in the received invert signal or its respective copy compares the received invert signal and its respective copy.

According to a third aspect of the present invention, there is provided a system comprising a module for transmitting as described above and a module for receiving as described above, the modules being connected via a communication bus.

For a better understanding of the present invention, and to show more clearly how it may be carried into effect, reference will now be made, by way of example, to the following drawings, in which.

In the prior art dual-rail encoder described above, copies of the input data bits d0, d1, d2 and d3 are generated in a transmitting module, and these copies are used to correct errors that are detected in received data bits D0, D1, D2 and D3 by a receiving module.

As each data line in the output of the transmitting module to a communication bus has a corresponding line carrying an identical copy of the signal on the data line, the problem of ground bounce and simultaneous switching are increased relative to systems that do not use copies of the data bits.

For example, consider a four-line bus with each data line having a high signal (i.e. 1 1 1 1). If there is a transition on each of the data lines to a low signal (i.e. requiring four transitions) then a significant amount of charge will be dumped onto the ground plane, causing 'ground bounce'.

Now, if the four-line bus uses dual-rail encoding, there will be additional lines for each of the four data lines, each carrying a copy of the signal on their respective data line. Therefore, if each data line carries a high signal (and hence each copy line also carries a high signal) then a transition of each data line from a high signal to a low signal will result in eight lines discharging to the ground plane, causing twice as much 'ground bounce' and requiring twice as many transitions (i.e. eight) as in a normal four-line bus.

To reduce the problem of ground bounce in a structure that uses dual-rail encoding, the AC and DC stability of the code used to transmit the data is increased. That is, AC and DC stability is achieved when the number of lines transitioning from a high signal to a low signal is the same as the number of lines transitioning from a low signal to a high signal; and the number of lines carrying a high signal is the same as the number of lines carrying a low signal.

Figure 3:
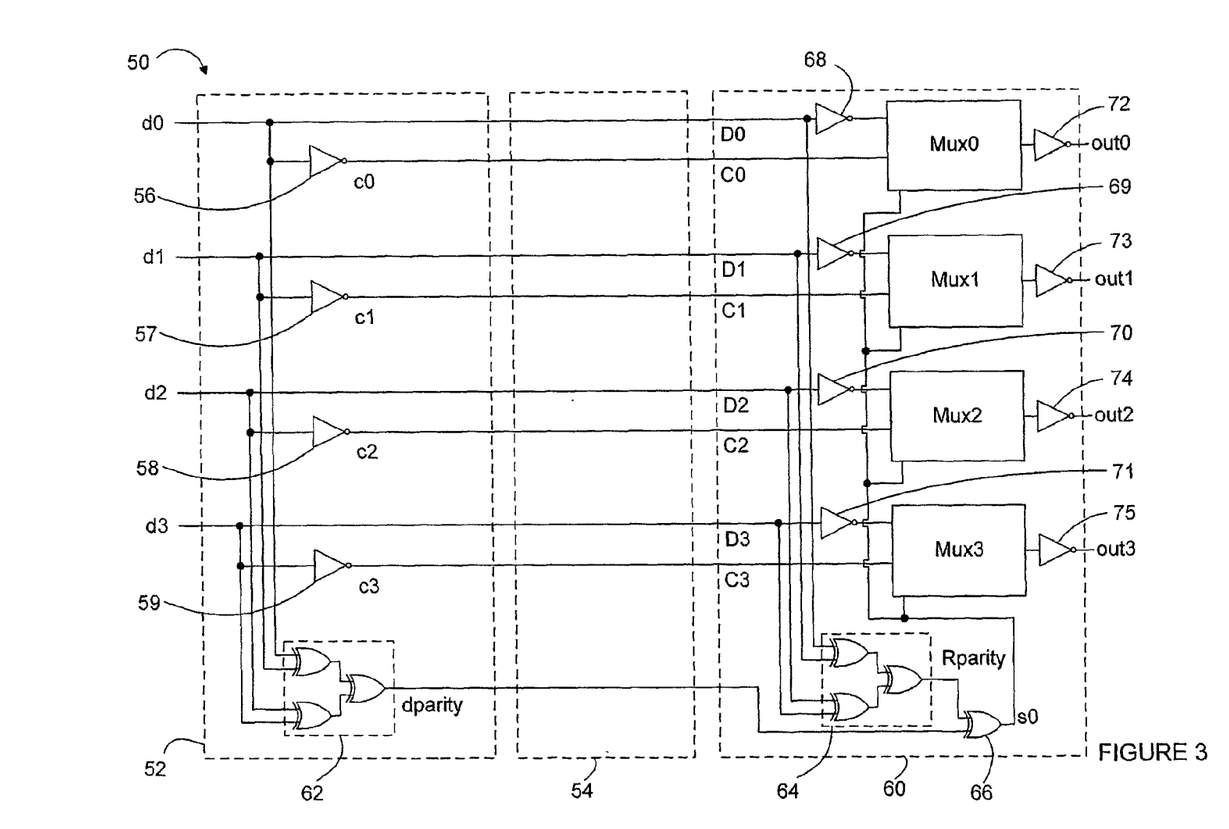
FIG. 3 shows a system using dual-rail encoding having reduced ground bounce.

FIG. 3 shows a system using dual-rail encoding having reduced ground bounce. In the system 50, there are four input data rails carrying data bits d0, d1, d2 and d3.

As described above, in addition to the data lines carrying data bits d0, d1, d2 and d3, there are provided lines that carry copies of the data bits.

However, the AC and DC stability of the system 50 is increased by inverting the signals on the lines that carry the respective copies of the data bits before transmission of the data across communication bus 54.

Therefore, the copies of the data bits are inverted by respective inverters 56, 57, 58 and 59, and are denoted c0, c1, c2 and c3 (note that from FIG. 3 onwards, c0, c1, c2 and c3 represent the inverted copies of bits transmitted on the data lines, not the non-inverted copies as described in FIG. 2).

As each line to the communication bus 54 carrying a data bit has a corresponding line carrying an inverted copy of the data bit, the number of lines carrying a high signal will be the same as the number of wires carrying a low signal. Therefore, the output of the transmitting module 52 is DC stable. When transitions occur, as any data bit transitioning from the first state to the second state will be accompanied by its respective inverted copy transitioning from the second state to the first state (and vice versa), the number of transitions from a high signal to a low signal will be the same as the number of transitions from a low signal to a high signal. Therefore, the output of the transmitting module 52 is AC stable. Hence, the problem of ground bounce in the communication bus 54 caused by transitions on the data lines has been reduced.

The data bits d0, d1, d2 and d3 and their respective inverted copies c0, c1, c2 and c3, forming the output of the transmitting module 52, are transmitted to a receiving module 60 via the communication bus 54.

It should be noted that the transmitting and receiving modules 52, 60 may not be separate circuit components from the communication bus 54, but they may form a single integrated unit. Specifically, the transmitting module 52 may be the driver for the communication bus 54, and the module 60 may be the receiver.

During transmission across the communication bus 54, the transmitted data bits and their respective inverted copies may become 'faulty', that is, the transmitted bit may be detected as a '1' instead of a '0', or vice versa. Therefore, data bits D0, D1, D2 and D3 and the respective inverted copies C0, C1, C2 and C3 received in the receiving module 60 may, or may not, be the same as the data bits d0, d1, d2 and d3 and respective inverted copy bits c0, c1, c2, c3 transmitted by the transmitting module 52.

In order for the receiving module 60 to detect errors in the received data bits D0, D1, D2 and D3, a parity bit, dparity, is calculated by the transmitting module 52 and provided to the receiving module 60. This parity bit is calculated in the transmitting module 52 for the data bits to be transmitted using parity tree 62, which, in this illustrated system, comprises three exclusive OR gates. However, it will be appreciated that the parity tree 62 may comprise other combinations of logic gates.

The transmitting module 52 then transmits the parity bit, dparity, to the receiving module 60 along with data bits d0, d1, d2 and d3, and their respective inverted copies c0, c1, c2 and c3 via the communications bus 54.

The receiving module 60 calculates a parity bit, Rparity, for the received data bits D0, D1, D2 and D3. The data parity bit, Rparity, is calculated using parity tree 64, which is identical in structure to parity tree 62 in the transmitting module 52.

The receiving module 60 then compares the data parity bit, Rparity, with the parity bit received over the communications bus 54. In this illustrated system, the comparison is performed by exclusive OR gate 66. However, it will appreciated that the comparison may be performed by other types of logic gates. The output of the exclusive OR gate 66 is a multiplexer control bit s0.

The multiplexer control signal s0 is fed into a plurality of dual-input multiplexers Mux0, Mux1, Mux2 and Mux3 that act as correction circuits for the receiving module 60. Each multiplexer, Mux0, Mux1, Mux2 and Mux3 receives a respective received data bit D0, D1, D2 or D3 and a corresponding received inverted copy of the data bit C0, C1, C2 or C3.

As is conventional, the multiplexer control bit s0 determines which of the signals input into the multiplexer is to be used as the output of the multiplexer. When the multiplexer control bit is low (i.e. a '0'), the output of the multiplexer will be the received data bit. However, when the multiplexer control bit is high (i.e. a '1'), the output of the multiplexer will be the received inverted copy of the associated data bit.

However, it will be appreciated that, in order for errors in the received data bits D0, D1, D2 and D3 to be corrected by the multiplexers Mux0, Mux1, Mux2 and Mux3, the received inverted copies of the data bits C0, C1, C2 and C3 must be inverted relative to the received data bits.

A first structure for achieving this is shown in FIG. 3. Here, each received data bit D0, D1, D2 and D3 is inverted by a respective inverter 68, 69, 70 and 71 before they are input into the respective multiplexers Mux0, Mux1, Mux2 and Mux3. Since the output of the multiplexers is now the inverse of the desired signal, further inverters 72, 73, 74 and 75 invert the outputs of the multiplexers Mux0, Mux1, Mux2 and Mux3 respectively to form the output signals of the receiving module 60, namely, signals out0, out1, out2 and out3.

Figure 4:
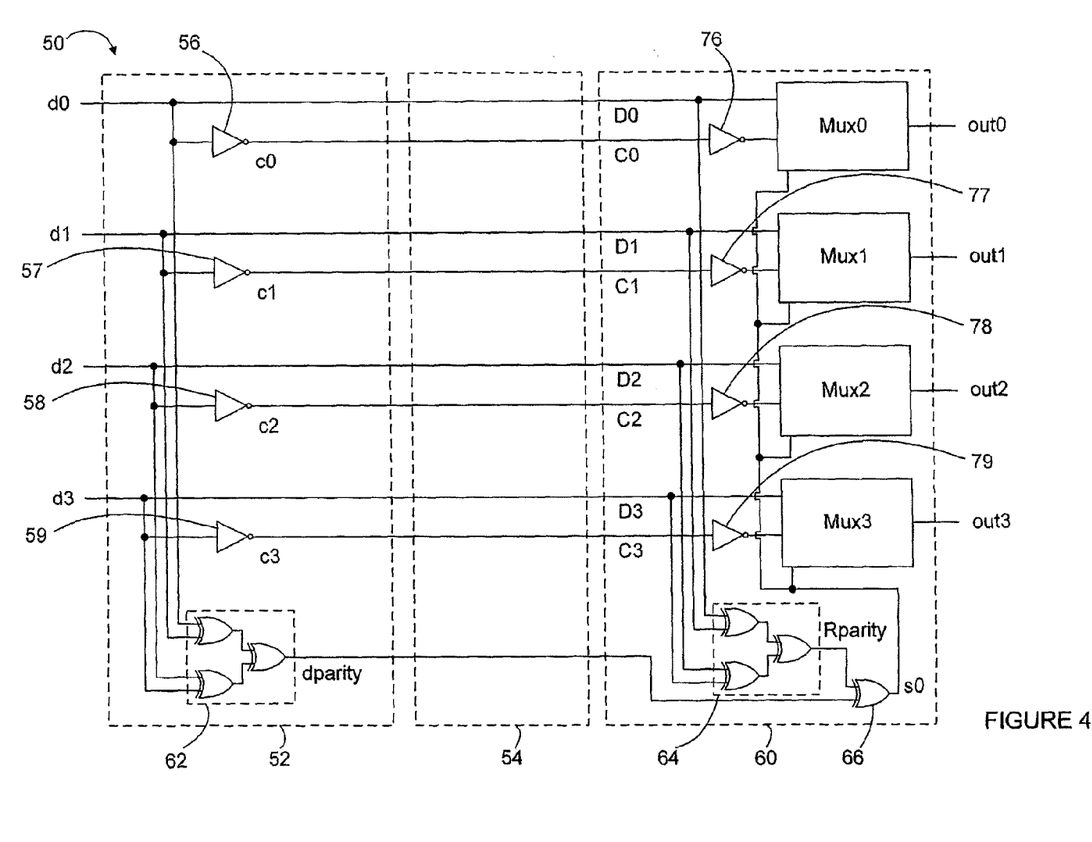
FIG. 4 shows an alternative system using dual-rail encoding having reduced ground bounce.

FIG. 4 shows an alternative structure for inverting the received inverted copies of the data bits relative to the received data bits. Here, each received inverted copy C0, C1, C2 and C3 is inverted by a respective inverter 76, 77, 78 and 79 before they are input into the respective multiplexers Mux0, Mux1, Mux2 and Mux3.

Therefore, in both of these structures, when the parity bit for the received data, Rparity, is the same as the received data parity bit, the multiplexer control bit s0 is a '0', which instructs the multiplexers Mux0, Mux1, Mux2 and Mux3, to output the received data bits D0, D1, D2 and D3. However, when the parity bit for the received data, Rparity, is different to the received data parity bit, (and hence that the received data bits D0, D1, D2 and/or D3 are different to the transmitted data bits d0, d1, d2, and d3) the multiplexer control signal s0 is a '1', which instructs the multiplexers Mux0, Mux1, Mux2 and Mux3, to output the received copies of the transmitted data bits C0, C1, C2 and C3.

In this system, a single-error model is assumed. That is, only one error is assumed to have occurred in the received data or parity bits. Therefore, there may be an error in the received data bits, received copy bits or received parity bit. Therefore, when the received parity bit is different to the parity bit generated from the received data bits, either there is an error in a data bit, or there is an error in the received parity bit. This means that if the received data is correct and the received parity bit is erroneous, the copy bits will be used as the output of the receiving module (the copy bits are correct as a single error model is assumed).

It will be appreciated that in the dual-rail encoding system described above, where a parity bit is transmitted to the receiving module 60 along with the data bits and their respective inverted copies, the transmission is not perfectly AC and DC stable.

To achieve perfect AC and DC stability, the transmitting module generates an inverted copy of the data parity bit and transmits this to the receiving module, along with the data bits, their respective inverted copies, and the data parity bit, dparity.

Figure 5:
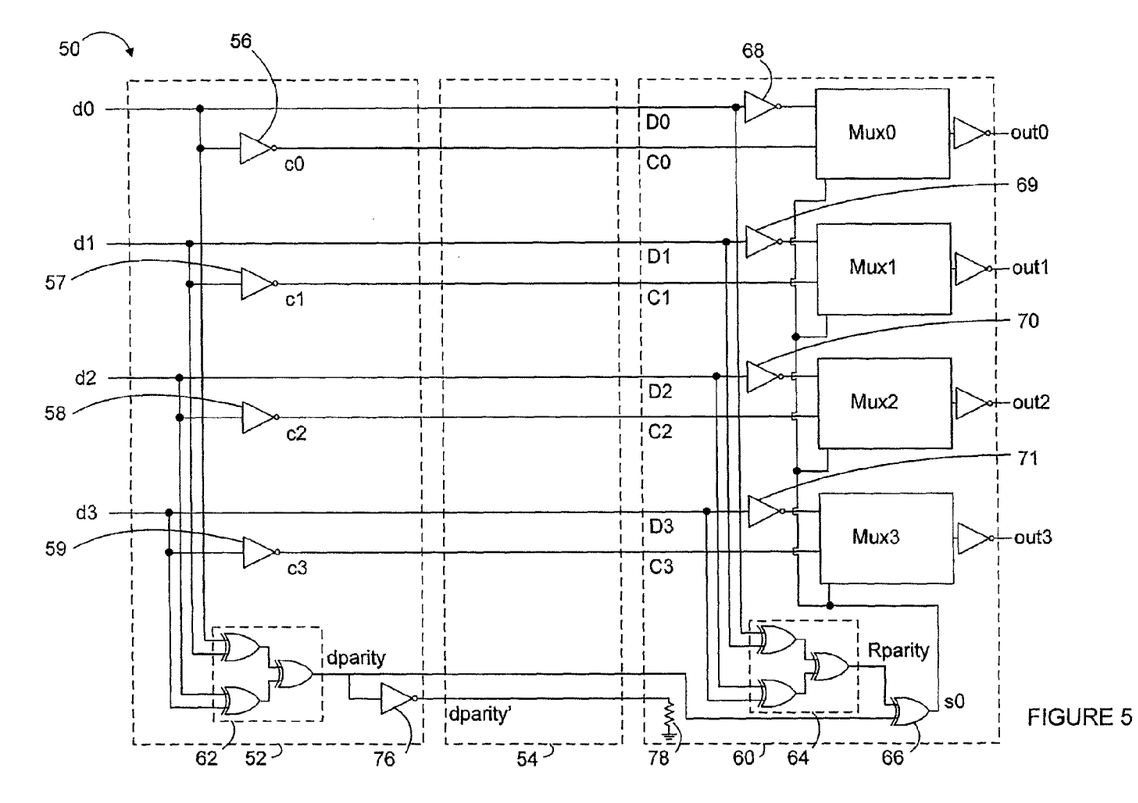
FIG. 5 shows another system using dual-rail encoding with reduced ground bounce.

A system with perfect AC and DC stability is shown in FIG. 5. In FIG. 5, features that are common to the systems shown in FIGS. 3 and 4 are given the same reference numerals.

As described above, to achieve perfect AC and DC stability in the transmission across the communication bus 54, the transmitted data parity bit, dparity, is copied, inverted by inverter 76 and is transmitted across the communication bus 54 to the receiving module 60. Therefore, since every data line has an inverse copy, and the parity bit, dparity, has an inverse copy, dparity', the transmission is perfectly AC and DC stable. Therefore, the problem of ground bounce caused by transitions at the communication bus 54 is eliminated.

In the receiving module 60, the received inverse copy of the data parity bit is discharged to the ground plane via a resistor 78.

Although the problem of ground bounce caused by transitions at the communication bus has been reduced, the switching activity of the system is still much higher than in a single rail system.

Therefore, in accordance with a first aspect of the present invention, when more than half of the data lines in the bus are to switch, bus invert coding is used to reduce the number of transitions. At the receiving end, the inverted state of the data on the bus can be detected, and the correct data can be read out. This technique means that no more than half of the wires will need to switch at any one time, reducing the total switching activity in the system.

As an example of bus invert coding, consider a first data word 1100 being transmitted across a bus. The next word to be transmitted across the bus is 0010, which means that, in a conventional system, there will be a transition on each of the first three lines.

However, when more than half of the wires switch at any one time, as in this example, bus invert coding is used, which means that the inverse of the desired word is transmitted across the bus. Therefore, in the above example, the content of the bus will be inverted so that the second word is transmitted as 1101. This is then inverted in the receiver to obtain the desired word (0010). Therefore, this technique reduces three transitions across the bus to just one (on the fourth line).

Figure 6:
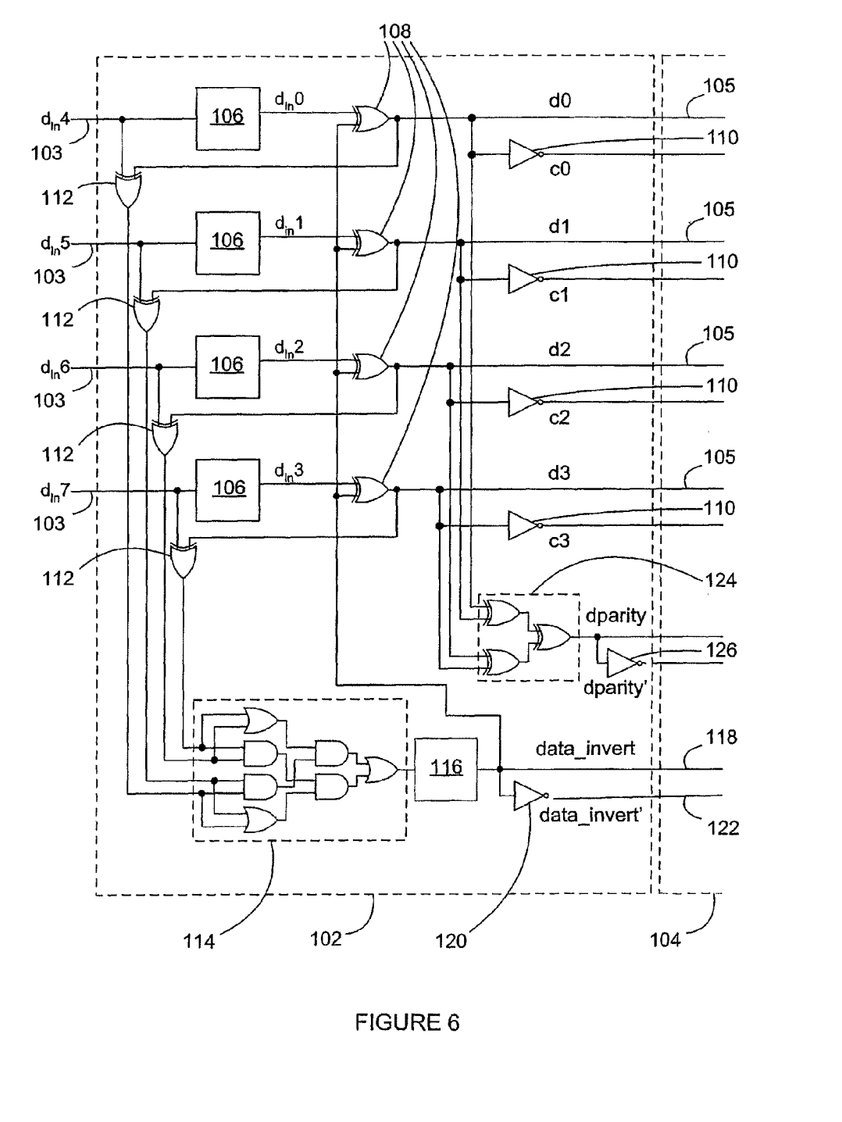
FIG. 6 shows a transmitting module in accordance with a first embodiment of the present invention.

FIG. 6 shows an embodiment of a transmitting module in accordance with the first aspect of the present invention.

The transmitting module 102 has four input rails 103 for receiving data to be transmitted across a communication bus 104. Of course, it will be appreciated that a transmitting module may have more or less than four input rails.

When the transmitting module 102 is operating, data bits are being output to a communication bus 104. After a suitable time interval, the transmitting module 102 outputs a new set of data bits to the communication bus 104.

In FIG. 6, the data bits presently being transmitted across the bus 104 are denoted d0, d1, d2 and d3. Since, in accordance with the invention, the data bits being transmitted across the bus 104 may be inverted, the data bits (d0, d1, d2 and d3) being transmitted across communication bus 104 over respective lines 105, may not be the same as the data bits originally received by the transmitting module 102 on its input rails 103. The data bits originally received on input rails 103 have been stored by respective latches 106, and are denoted $d_{in}0$, $d_{in}1$, $d_{in}2$ and $d_{in}3$ respectively. Herein, these data bits ($d_{in}0$, $d_{in}1$, $d_{in}2$ and $d_{in}3$) will be referred to collectively as the 'first data word'.

The next set of data bits to be transmitted by the transmitting module 102 after the first data word are received on the input rails 103 whilst the transmission of the first data word (d0, d1, d2 and d3) is occurring, and the data bits in this set are denoted $d_{in}4$, $d_{in}5$, $d_{in}6$ and $d_{in}7$ respectively. Herein, these data bits ($d_{in}4$, $d_{in}5$, $d_{in}6$ and $d_{in}7$) will be known collectively as the 'second data word'.

Therefore, according to this illustrated embodiment of the invention, the transmitting module 102 comprises input rails 103 for receiving the data bits to be transmitted, and these rails 103 are connected to respective latches 106. These latches store the original data bits ($d_{in}0$, $d_{in}1$, $d_{in}2$ and $d_{in}3$) for the word currently being transmitted across the communication bus 104. The output of each latch 106 is connected to one input of a respective exclusive OR gate 108. The other input of each exclusive OR gate 108 receives a data_invert signal, which indicates whether the data should be inverted to transmit the current data word.

Although well known in the art, a truth table for one of the exclusive OR gates 108 is shown below:

| $d_{in}$ | data_invert | d |
|---|---|---|
| 0 | 0 | 0 |
| 1 | 0 | 1 |
| 0 | 1 | 1 |
| 1 | 1 | 0 |

It can be seen that, when it is determined that the data is not to be inverted (i.e. data_invert is a '0'), the output, d, of the exclusive OR gate (and hence of the transmitting module 102) on data line 105 is the same as the data bit, $d_{in}$, originally received on the input rail 103. However, when it is determined that the data should be inverted (i.e. data_invert is a '1'), the output, d, of the exclusive OR gate (and hence of the transmitting module 102) is the opposite of the data bit, $d_{in}$, originally received on the input rail 103.

As described above with reference to FIGS. 3, 4 and 5, copies of the data bits (d0, d1, d2 and d3) being transmitted through lines 105 are generated and inverted by respective inverters 110 to reduce the ground bounce of the dual-rail system. In the module shown in FIG. 6, these data bits are again denoted c0, c1, c2 and c3 respectively.

In order to determine if the data bits of the second word ($d_{in}4$, $d_{in}5$, $d_{in}6$ and $d_{in}7$) should be inverted when being transmitted, it is necessary to compare the data bits of the second word with the bits of the previous data word. This comparison determines whether the number of transitions required to transmit the second set of data bits after the first set is greater than half of the total number of bits in a data word. If the number of transitions is greater than half the total number of data bits, the next data word should be inverted before transmission.

In this illustrated embodiment, the comparison is performed by exclusive OR gates 112 and comparison circuit 114. Each exclusive OR gate 112 has a currently transmitted data bit (d0, d1, d2 or d3) as one input, and the next data bit to be transmitted ($d_{in}4$, $d_{in}5$, $d_{in}6$ or $d_{in}7$) as the other input.

Therefore, when a currently transmitted data bit is different to the next data bit to be transmitted, the output of the exclusive OR gate 112 will be a '1'. However, if the currently transmitted data bit is the same as the next data bit to be transmitted, the output will be a '0'.

The outputs of the exclusive OR gates 112 are fed into the comparison circuit 114. The comparison circuit 114 determines if more than half of the lines will change when transmission of the second data word occurs. One circuit for performing this is shown in FIG. 6, and comprises three OR gates, and four AND gates. It will be appreciated that this configuration (including the exclusive OR gates 112) is exemplary and many other circuits may be used to compare two consecutive data words.

If the comparison circuit 114 determines that more than half of the lines will change at the next bus transition (i.e. more than half of the outputs of the exclusive OR gates 112 are '1'), the output of this exemplary comparison circuit will be a '1' (indicating that the data should be inverted before transmission). However, if the comparison circuit 114 determines that equal to or less than half of the lines will change at the next bus transition, the output of the comparison circuit 114 will be a '0' (indicating that the data should not be inverted). It should be noted that this signal is the data_invert signal for the second data word.

A latch 116 is provided at the output of the comparison circuit 114 that stores the data_invert signal for the first data word whilst the first data word is being transmitted across the communication bus 104. It should be noted that the data_invert signal for the first data word has been derived from the comparison of the first data word bits ($d_{in}0$, $d_{in}1$, $d_{in}2$ and $d_{in}3$) with the bits transmitted across the bus 104 prior to the transmission of the first data word.

As described above, the output of the latch 116, the data_invert signal, is provided to the second input of the exclusive OR gates 108, which invert the bits ($d_{in}0$, $d_{in}1$, $d_{in}2$ and $d_{in}3$) before transmission if the data is to be inverted.

In addition, in order for the correct data to be read out at the receiving end, an indication of whether the second data word has been inverted is transmitted across the communication bus 104 to the receiving module. In this illustrated embodiment, the data_invert signal is the indication and is transmitted across the communication bus 104 to the receiving module on line 118.

Preferably, to maintain the AC and DC stability of the system, and hence the reduction in ground bounce achieved by inverting the copies of the data bits being transmitted across the communication bus 104, a copy of the data_invert signal is generated in the transmitting module 102, inverted by inverter 120 to form signal data_invert', and is transmitted across the communication bus 104 on line 122.

Preferably, in order to allow the receiving module to correct errors in the received data bits, a parity signal, dparity, is generated by a parity tree 124. As described above with reference to FIGS. 2 to 5, the parity signal, dparity, is generated from the data bits being transmitted (d0, d1, d2 and d3).

It will be appreciated that the parity signal can also be generated from the bits making up the first data word ($d_{in}0$, $d_{in}1$, $d_{in}2$ and $d_{in}3$). The parity signal, dparity, will be the same in either case, as inverting the data word does not change the parity (the parity generated from a set of signals is the same as the parity generated from inverted copies of those signals).

Again as described above, an inverted copy of the parity signal is generated by inverter 126, and is transmitted across the communication bus 104, to maintain the AC and DC stability of the system.

It will also be appreciated that the transitions of the parity signal, dparity, can be taken into account when determining whether to invert the data. For example, in this case (not illustrated in FIG. 6), the parity signal for the data word currently being transmitted can be treated in a similar way to the signals on the data lines. That is, the current parity signal can be compared to the parity signal for the next data word, and the result of this comparison can be input into the comparison circuit 114.

Furthermore, it is also possible to consider transitions of the data_invert signal, and take these into account when determining whether to invert the data for transmission.

A person skilled in the art will appreciate that there are many different ways of implementing these options into a system as shown in FIG. 6.

Figure 7:
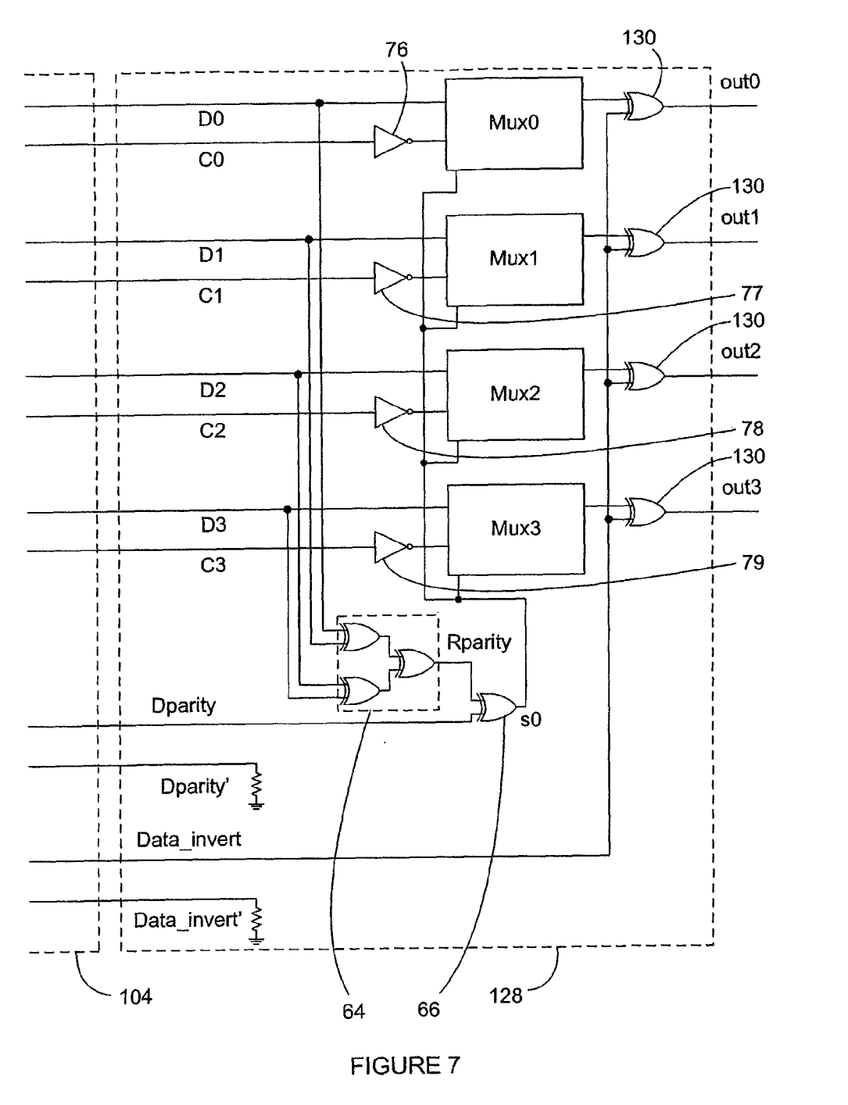
FIG. 7 shows a receiving module in accordance with the first embodiment of the present invention.

FIG. 7 shows an embodiment of a receiving module according to the first aspect of the present invention.

The receiving module 128 is connected to the communication bus 104 and receives the transmitted data bits, D0, D1, D2 and D3, and their respective inverted copies, C0, C1, C2 and C3.

The receiving module 128 comprises respective inverters 76, 77, 78 and 79 for inverting the received copies of the data bits for input into multiplexers (Mux0, Mux1, Mux2 and Mux3) as described above with reference to FIG. 4. The receiving module 128 also comprises a parity tree 64 for generating a parity bit from the received data bits, Rparity. This parity bit is compared with the received parity bit, Dparity, and determines a control bit, s0, for the multiplexers, as described above.

As described above, when more than half of the lines will switch when starting to transmit a data word, all of the signals are inverted before transmission across the bus 104. Therefore, in order for the receiving module 128 to provide the correct data at its outputs (out0, out1, out2 and out3), the output of each multiplexer is connected to a respective exclusive OR gate 130. The second input of each exclusive OR gate 130 is provided by the received bus invert signal, Data_invert.

Therefore, when the data on the bus has been inverted (i.e. the Data_invert signal is a '1') and the outputs of the multiplexers are the inverse of the correct signals, the exclusive OR gates 130 will act to invert the signals to provide the correct outputs. If the data on the bus has not been inverted (i.e. the Data_invert signal is a '0'), the exclusive OR gates 130 will output the signals at the outputs of the multiplexers.

The received inverted data parity bit, Dparity', and the received inverted invert signal, Data_invert', are grounded via resistors.

Alternatively, the received inverted invert signal, Data_invert', can be used to check the received invert signal, Data_invert, for an error. In the case where no errors have occurred in the received invert signal and the received inverted invert signal, the signals will be opposite to each other. However, when an error has occurred in either signal, the received invert signal and the received inverted invert signal will be the same. Therefore, in this situation, a retransmission of the data must be requested as it is not possible to determine which of the invert signals contains the error.

It will be appreciated that the embodiment described above in accordance with the first aspect of the invention provides a dual-rail encoding structure having reduced switching activity.

One disadvantage with the system described above is that extra lines are required to transmit the invert indication signal and its inverse to the receiving module.

Therefore, in accordance with a second aspect of the present invention, the indication of whether the second set of data bits has been inverted is encoded into the parity signal and its copy.

Figure 8:
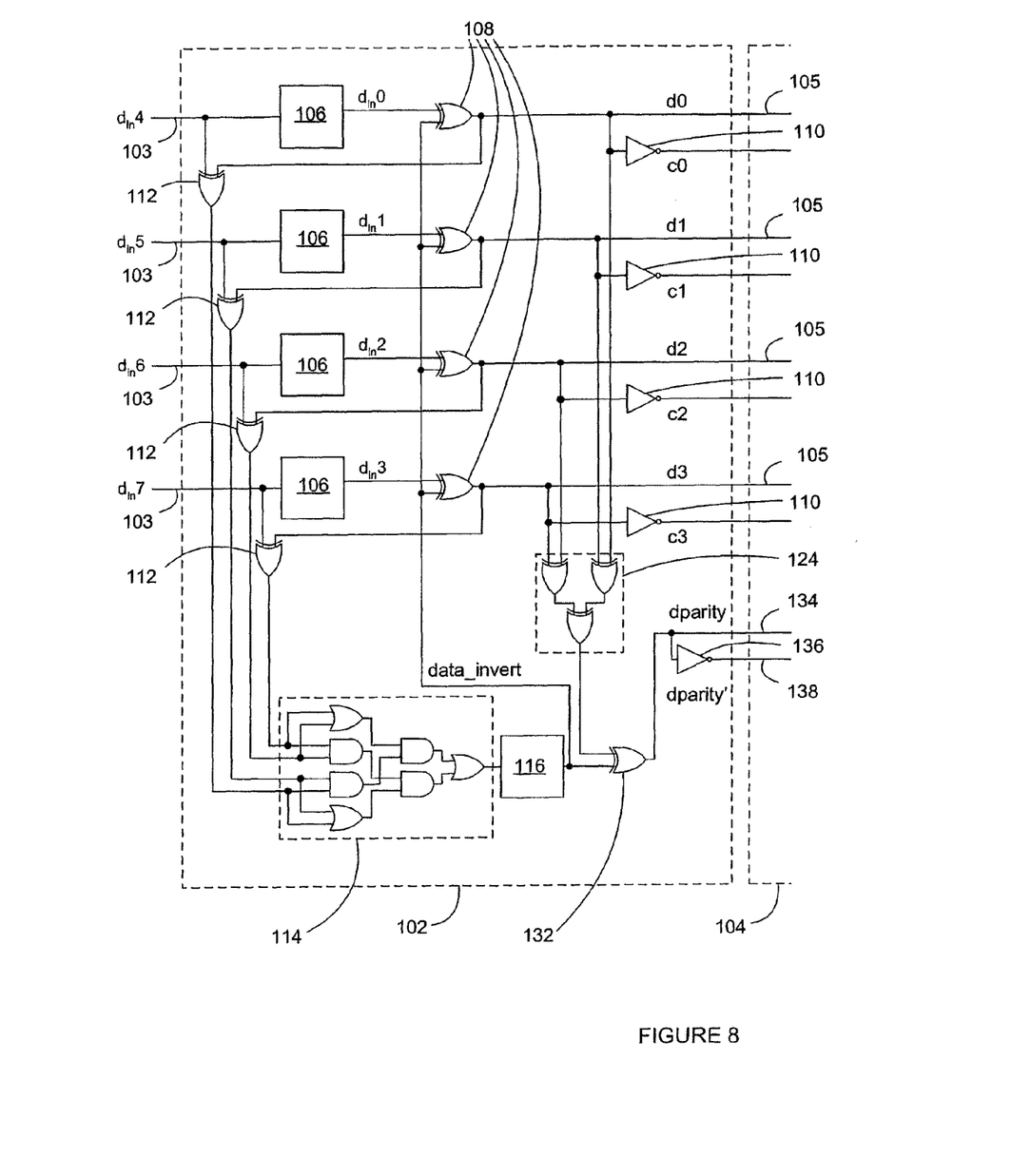
FIG. 8 shows a transmitting module in accordance with a second embodiment of the present invention.

FIG. 8 shows an embodiment of a transmitting module in accordance with the second aspect of the present invention.

The module shown in FIG. 8 has many components in common with the module shown in FIG. 6, and these components have been given the same reference numerals.

In this illustrated embodiment, the parity signals, dparity and dparity', are considered as a signal pair and are both inverted when the data signals on the bus 104 have been inverted.

The output of the latch 116 (the data invert signal for the data currently being transmitted across the bus 104) is used to control the operation of the exclusive OR gates 108 as described above. In addition, the data_invert signal is input into an exclusive OR gate 132, along with the parity signal generated by the parity tree 124. Exclusive OR gate 132 acts to invert the parity signal if the data on the bus 104 is inverted, or acts to pass the parity signal un-inverted if the data on the bus 104 is not inverted. The output of gate 132 has been denoted dparity, and this is equal to the parity of the data if the data on the bus is not inverted, or equal to the inverse of the parity of the data if the data on the bus is inverted. This parity signal is transmitted across the bus 104 on line 134.

An inverted copy of dparity is generated by inverter 136 and is also transmitted across the data bus 104 on line 138. It should be noted that dparity' is the inverted copy of dparity, and not the inverse of the output of parity tree 124.

Therefore, when the data on the bus 104 has been inverted, the transmitted parity and inverted parity are the inverse of their expected values.

Figure 9:
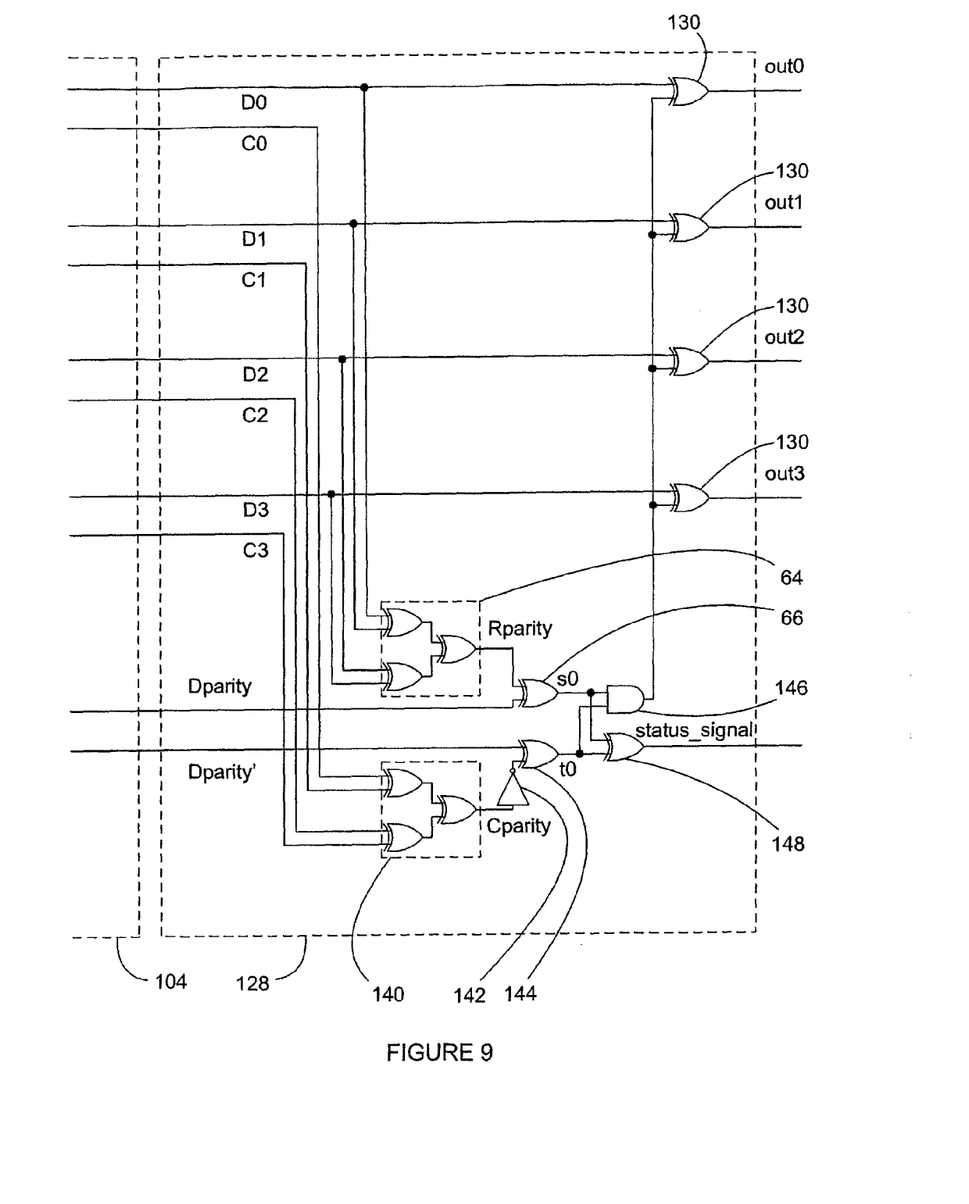
FIG. 9 shows a receiving module in accordance with the second embodiment of the present invention.

A receiver according to the second embodiment of the present invention is shown in FIG. 9. It will be noted that the system is no longer able to correct errors in received signals, as the parity bit is used to indicate inversion of the data on the bus. However, it is possible to detect errors in the received data, and request retransmission if necessary.

The receiving module is connected to the communication bus 104 and receives the transmitted data bits, D0, D1, D2 and D3, their respective inverted copies, C0, C1, C2 and C3, and a parity and inverted parity signal, Dparity and Dparity' respectively.

In contrast to the receiving module shown in FIG. 7, as the receiving module 128 according to this embodiment of the present invention cannot correct errors, the received data bits, D0, D1, D2 and D3 are connected straight into respective exclusive OR gates 130. As before, these gates serve to invert the received data, if it is determined that the data on the bus was inverted for transmission.

In order for the receiving module 128 to determine if the data on the bus 104 has been inverted (and therefore its output should be inverted to obtain the correct data), the received parity signals must be compared with the received data. As described above, the parity calculated from a set of data bits will be the same as the parity calculated from an inverted set of those data bits. Therefore, when the receiving module 128 compares the parities of the received data with the received parities, a difference in each received parity and the calculated parities will indicate that the data on the bus 104 was inverted for transmission, and the output of the receiving module 128 should be inverted to obtain the correct data.

Therefore, a parity bit for the received data, Rparity, is calculated by parity tree 64, and compared with the received parity bit, Dparity, by exclusive OR gate 66. The output of gate 66 is denoted s0. When the parity calculated from the received data bits, Rparity, is the same as the received parity, Dparity, s0 will be a '0'. However, when Rparity is different to Dparity, s0 will be a '1'.

A second parity tree 140 calculates a parity bit, Cparity, from the received copies of the data bits, C0, C1, C2 and C3. This parity bit is inverted by inverter 142 and compared with the received inverted parity, Dparity', by exclusive OR gate 144. The output of gate 144 is denoted t0. When the inverse of the parity calculated from the received inverted copies of the data bits, (inverse of Cparity), is the same as the received inverted parity, Dparity', to will be a '0'. However, when the inverse of Cparity is different to Dparity', t0 will be a '1'.

A comparison of signals s0 and t0 is performed by AND gate 146, the output of which is connected to each of the exclusive OR gates 130. Therefore, when both s0 and t0 are '1', (i.e. they indicate that Rparity does not equal Dparity, and Cparity' does not equal Dparity'), the output of the AND gate 146 is a '1', causing the exclusive OR gates 130 to invert the received data bits, D0, D1, D2 and D3. When both s0 and t0 are '0', (i.e. they indicate that Rparity equals Dparity, and Cparity' equals Dparity'), the output of the AND gate 146 is a '0', causing the exclusive OR gates 130 to pass the received data bits, D0, D1, D2 and D3 uninverted.

However, if one of s0 and to is a '1' whilst the other is a '0', then an error has occurred in the transmission, either in the received data bits, the received inverted copies or the received parities.

Therefore, an exclusive OR gate 148 is provided, having s0 and t0 as inputs, and this outputs a signal (status_signal) that indicates whether or not the transmission contains an error. Therefore, when s0 and t0 are different, the output of exclusive OR gate 148 will be a '1', indicating an error. This can then be used to discard the presently received data and request retransmission. When s0 and t0 are the same, the output of gate 148 will be a '0' indicating that no errors have been detected.

There are several possible causes when the status_signal indicates an error (it should be noted that a single error model is assumed in this system).

The first cause may be that the received parities, Dparity and Dparity', are equal. In this case, it is not possible to determine which of the parities contains the error, as the status of the data on the bus 104 is unknown (i.e. it is not known whether or not the data was inverted prior to transmission).

The second cause may be that there is an error in the received data bits (D0, D1, D2 or D3) or in the received inverted copies of the data bits (C0, C1, C2 or C3). If the parities for the received data bits (Rparity) and the received inverted copies of the data bits (Cparity) are different, this indicates that there is an error in a data bit or inverted copy of a data bit. However, it is not possible to correct this error, and retransmission is required.

It will be appreciated that the second aspect of the invention has the advantage of reducing switching activity in a dual-rail encoding structure, but without requiring a dedicated bus invert signal.

Figure 10:
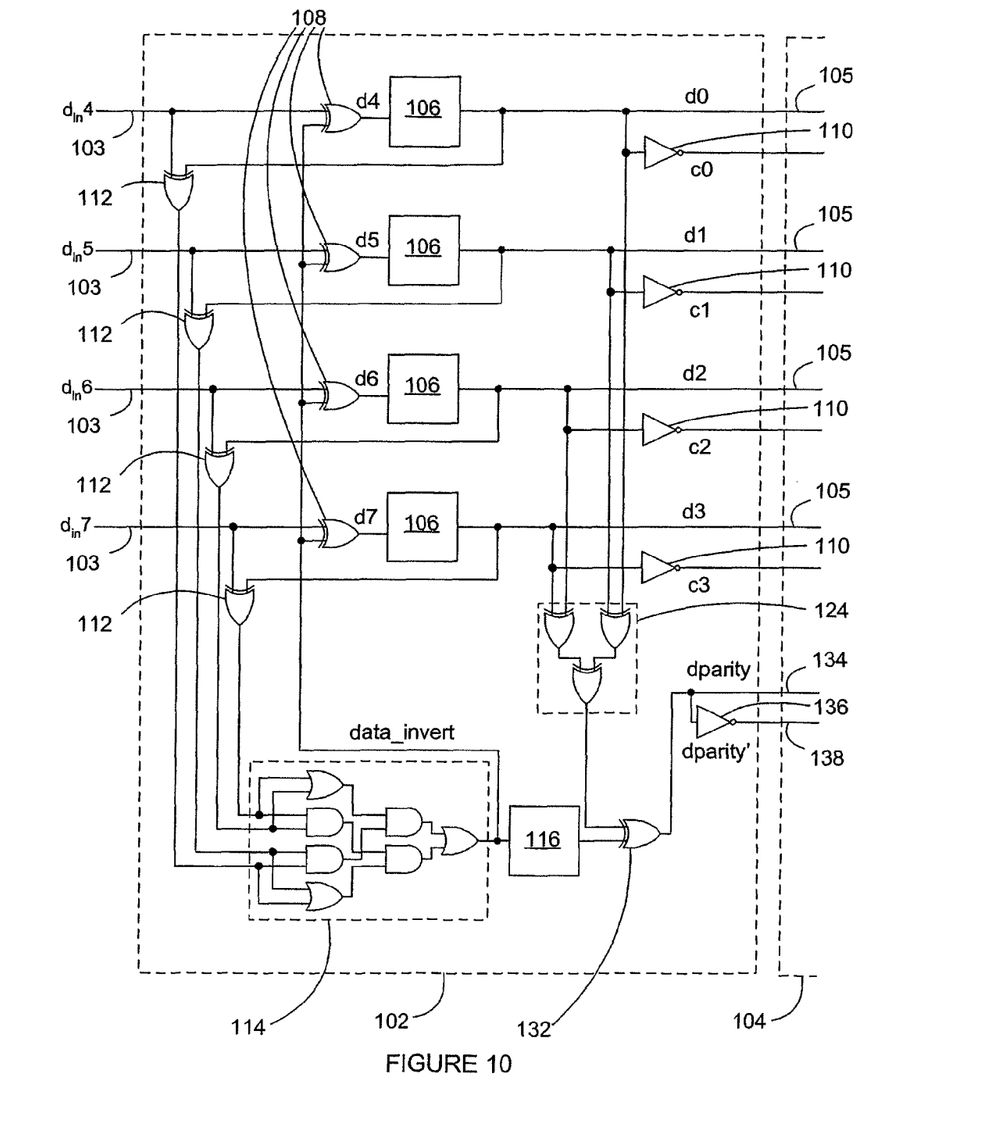
FIG. 10 shows an alternative configuration of the transmitting module according to the second embodiment of the present invention.

FIG. 10 shows an alternative configuration of the transmitting module according to the second aspect of the present invention.

In this transmitting module 102, the exclusive OR gates 108 are placed before their respective latches 106. This means that the inversion of the data occurs before the data is stored in the latches and transmitted across the bus 104. The inverted second data word bits are denoted d4, d5, d6 and d7. The data invert signal controlling the exclusive OR gates 108 is now taken directly from the output of the comparison circuit 114.

The advantage of this configuration is that glitches on the bus 104 due to timing mismatches between the latches 106 and the invert signal are avoided. Furthermore, there is a reduced chance of errors occurring on the bus 104 caused previously (e.g. in the module shown in FIG. 8) by the latches 106 switching and then the gates 108 inverting the switched signals.

It will also be appreciated that bus invert coding can be used in a conventional dual-rail system such as that shown in FIG. 2. In this case, the state of the data being transmitted across the communication bus can either be indicated by a data invert signal transmitted on a separate bus line, or by encoding the state of the data in the parity signal and a respective copy thereof in a similar way to the systems shown in FIGS. 8 and 10.

In this latter case, if the parity signals received in the receiving module both have the opposite value to the parities calculated from the received data bits, then the data was inverted before transmission, and the received data bits should be inverted to obtain the correct data word. If the parities have the expected values (i.e. they both correspond to the parities calculated from the received data bits) then the data was not inverted before transmission. If the received parities are different then an error has occurred in one of the parity bits.

Again, when the state of the data bits is encoded into the parity signal and its copy, it is not possible to correct errors in the received data, but it is still possible to detect errors.

A further advantage of the invention is that the bus-invert coding circuitry may be switched off when it is not necessary to reduce the switching activity on the communication bus. This can be achieved by 'fixing' the data_invert signal to a single value, thereby preventing the data from being inverted.

Although the invention has been described and illustrated with reference to a system that uses dual-rail encoding, it will be appreciated that the invention is not limited to such systems, and that many other applications of the invention will be apparent to a person skilled in the art.

There is therefore provided a method and system in which the ground bounce in a communication bus is reduced, and where the switching activity is minimized.

It should be noted that the above-mentioned embodiments illustrate rather than limit the invention, and that those skilled in the art will be able to design many alternative embodiments without departing from the scope of the appended claims. The word 'comprising' does not exclude the presence of elements or steps other than those listed in a claim.

The invention claimed is:

1. A module for transmitting sets of data bits to another module via a communication bus, the module comprising:
   bus invert coding means for reducing the number of transitions on the communication bus as the module operates; the bus invert coding means being adapted to:
   compare a set of data bits with a preceding set of data bits to determine an indication of the number of transitions required to transmit the set of data bits;
   invert the set of data bits prior to transmission if it is determined that the number of transitions required to transmit the set of data bits is greater than half the total number of bits in the set of data bits; and
   provide an indication of whether the set of data bits has been inverted;
   means adapted to generate respective copies of the data bits in the set of data bits; and
   means adapted to transmit to the other module, via the communication bus, the set of data bits, their respective copies and the indication of whether the set of data bits has been inverted.

2. A module as claimed in claim 1, wherein the means adapted to generate respective copies of the data bits is further adapted to invert the respective copies.

3. A module as claimed in claim 1, further comprising:
   means adapted to generate a first parity bit from the set of data bits;
   wherein the means adapted to transmit is further adapted to transmit the first parity bit to the other module.

4. A module as claimed in claim 3, wherein the means adapted to generate a first parity bit comprises one or more logic gates.

5. A module as claimed in claim 3, further comprising:
   means adapted to generate a copy of the first parity bit;
   wherein the means adapted to transmit is further adapted to transmit the copy of the first parity bit to the other module.

6. A module as claimed in claim 5, wherein the means adapted to generate respective copies of the data bits is further adapted to invert the respective copies, and wherein the means adapted to generate a copy of the first parity bit is further adapted to invert the copy of the first parity bit.

7. A module as claimed in claim 5, wherein the indication of whether the set of data bits has been inverted is encoded in the first parity bit and its respective copy.

8. A module as claimed in claim 7, wherein the first parity bit and its respective copy are inverted before transmission if the set of data bits has been inverted by the bus invert coding means.

9. A module as claimed in claim 7, wherein the first parity bit and its respective copy are inverted before transmission if the set of data bits has not been inverted by the bus invert coding means.

10. A module as claimed in claim 1, wherein the bus invert coding means comprises one or more logic gates.

11. A module as claimed in claim 1, wherein the indication comprises an invert signal.

12. A module as claimed in claim 11, further comprising:
   means adapted to generate a copy of the invert signal;
   wherein the means adapted to transmit is further adapted to transmit the copy of the invert signal to the other module.

13. A module as claimed in claim 12, wherein the means adapted to generate a copy of the invert signal is further adapted to invert the copy of the invert signal.

14. A module for receiving sets of data bits from another module via a communication bus, the module comprising:
   means adapted to receive a set of data bits, respective copies of the set of data bits and an indication of whether the set of data bits has been inverted;
   means adapted to select the received data bits as the output of the module in the event that the indication of whether the set of data bits has been inverted indicates that the set of data bits has not been inverted, and to select the inverse of the received data bits as the output of the module in the event that the indication indicates that the set of data bits has been inverted.

15. A module as claimed in claim 14, wherein the respective copies of the set of data bits are inverted copies of the set of data bits.

16. A module as claimed in claim 14, further comprising means for detecting the presence of one or more errors in the received set of data bits.

17. A module as claimed in claim 16, wherein the means adapted to receive is further adapted to receive a first parity bit from the other module; and wherein the module further comprises:
   means adapted to generate a second parity bit from the received set of data bits; and
   wherein the means adapted to detect the presence of one or more errors in the received set of data bits is adapted to compare the first and second parity bits.

18. A module as claimed in claim 17, wherein the means adapted to generate a second parity bit comprises one or more logic gates.

19. A module as claimed in claim 16, wherein the means adapted to detect the presence of one or more errors in the received data bits comprises a logic gate.

20. A module as claimed in claim 16, wherein the module further comprises means for correcting errors in the received set of data bits, the means for correcting errors being adapted to output a received data bit or its respective copy in response to a control signal output by the means adapted to detect.

21. A module as claimed in claim 17, wherein the means adapted to receive is further adapted to receive a copy of the first parity bit from the other module.

22. A module as claimed in claim 21, wherein the indication of whether the set of data bits has been inverted is encoded in the received first parity bit and its copy.

23. A module as claimed in claim 22, wherein the module further comprises:
   means adapted to generate a third parity bit from the respective copies of the set of data bits;
   means adapted to compare the received first parity bit, the received copy of the first parity bit, the second parity bit and the third parity bit to determine whether the set of data bits has been inverted.

24. A module as claimed in claim 14, wherein the indication comprises an invert signal.

25. A module as claimed in claim 24, wherein the means adapted to receive is further adapted to receive a copy of the invert signal from the other module.

26. A module as claimed in claim 25, wherein the copy of the invert signal is an inverted copy of the invert signal.

27. A module as claimed in claim 25, further comprising means for detecting the presence of an error in the received invert signal or its respective copy.

28. A module as claimed in claim 27, wherein the means for detecting the presence of an error in the received invert signal or its respective copy compares the received invert signal and its respective copy.

29. A system comprising a module for transmitting sets of data bits to another module via a communication bus, the module comprising:
   bus invert coding means for reducing the number of transitions on the communication bus as the module operates; the bus invert coding means being adapted to:
   compare a set of data bits with a preceding set of data bits to determine an indication of the number of transitions required to transmit the set of data bits;
   invert the set of data bits prior to transmission if it is determined that the number of transitions required to transmit the set of data bits is greater than half the total number of bits in the set of data bits; and
   provide an indication of whether the set of data bits has been inverted;
   means adapted to generate respective copies of the data bits in the set of data bits; and
   means adapted to transmit to the other module, via the communication bus, the set of data bits, their respective copies and the indication of whether the set of data bits has been inverted, and a module for receiving sets of data bits from another module via a communication bus, the module comprising:
   means adapted to receive a set of data bits, respective copies of the set of data bits and an indication of whether the set of data bits has been inverted;
   means adapted to select the received data bits as the output of the module in the event that the indication of whether the set of data bits has been inverted indicates that the set of data bits has not been inverted, and to select the inverse of the received data bits as the output of the module in the event that the indication indicates that the set of data bits has been inverted, the transmitting and receiving modules being connected via a communication bus.

* * * * *